Patented Feb. 24, 1931

1,793,922

UNITED STATES PATENT OFFICE

FOREST J. FUNK, OF WILMINGTON, DELAWARE, ASSIGNOR TO E. I. DU PONT DE NEMOURS & COMPANY, OF WILMINGTON, DELAWARE, A CORPORATION OF DELAWARE

SEED DISINFECTANT

No Drawing.   Application filed March 18, 1926.   Serial No. 95,789.

This invention relates to toxic preparations adapted for use as seed disinfectants. More particularly the invention is concerned with preparations of the character described which, because of their colloidal nature, are peculiarly adapted to be effectively applied in liquid form to the seeds.

In recent years the trend of the development of seed disinfectants has been in the direction of products which may be applied to the seed in the form of dry dust. There are, however, certain disadvantages inherent in the dry dusting of seeds which arise in part from the necessity of employing mechanical agitation. Mechanical agitation involves special apparatus and, on a large scale operation, a source of power. Also, in the case of certain seeds, considerable damage is caused by the agitation. Heretofore attempts to obviate this disadvantage by applying the disinfectant in liquid form have not proven satisfactory. Only soluble materials could be so applied and the cost and inconvenience involved in applying a sufficient quantity of such a solution to be effective rendered the method impractical.

I have now discovered a disinfecting preparation which is especially adapted for efficient application to the seeds in liquid form. The new preparation comprises, in admixture with the active disinfectant material, finely divided material adapted to form in water a homogeneous suspension or colloidal solution of a fairly permanent character. For this purpose I may use either reversible or irreversible colloids. The particles of such a suspension or solution naturally tend to adhere to an object immersed therein. It is, therefore, only necessary to dip the seeds in the water suspension or colloidal solution of the new preparation to thoroughly and instantaneously apply to them a layer of material embodying the disinfectant.

For this purpose either water soluble or insoluble disinfectants may be advantageously applied in this manner. If insoluble, the finely divided disinfectant will be buoyed up when water is added and held uniformly distributed throughout the liquid mass by the colloidal matter. If the disinfectant is soluble in the water it follows that a much larger quantity of the solution will be held on the dipped seed by the adhering colloidal matter than would remain on a seed dipped in an ordinary solution of the disinfectant. The suspension may also be applied by sprinkling or in any other well known manner so long as the seed is thoroughly wetted.

As examples of finely divided materials which lend themselves to the preparation of a product of such physical composition that a homogeneous and relatively permanent suspension is formed in water, I may mention potters clay, kaolin, bentonite, gelatin, glue, casein and agar-agar. It will be obvious that other finely divided materials adapted to form a colloidal suspension or solution in water may be employed.

I have used the term "hydrophylic colloidal material" in this application to indicate a finely divided solid material which has the property of forming, with water, a relatively permanent and substantially homogeneous suspension.

In addition to the disinfectant and colloid I may also employ an inert, non-colloidal material as a mechanical diluent to add to the covering power of the active constituent. Fuller's earth, diatomaceous earth, hydrated lime, calcium carbonate, dolomite and calcium sulphate are examples of such a material. These inert materials may be of such nature that upon drying a relatively hard coating not easily removed by friction will be formed.

The active disinfectant material is also, of course, susceptible of variation. I have found the organic mercury compounds to be particularly adapted to my purpose. Especially suitable are the mercurized derivatives of phenols including cresols and naphthols as, for example, the mercuric compounds of chlor-phenols and nitro-phenols.

In order to disclose the invention in more detail the following examples of actual embodiments thereof are presented. It is to be understood, of course, that these examples are furnished for illustrative purposes solely, and that it is not my intention to be limited to the proportions or ingredients therein set forth.

*Examples*

1. 10% of finely divided mercurized p-nitro phenol and 90% of kaolin are intimately mixed as a fine dust. This material is then mixed with water at the rate of 1 pt. dust to 9 pts water. The resulting thin paste is then used as a liquid dip into which the seed, e. g., potatoes, is momentarily immersed and then removed to dry.

2. 10% hydroxy mercury chlor phenol, 20% calcium sulfate, and 70% bentonite are finely ground and mixed together thoroughly and used as a 10% suspension in water. When dry the coating on the seed e. g. potatoes produced by immersion sets to form a hard coating not easily removed by friction.

3. 1% corrosive sublimate, 29% calicum sulfate, 70% bentonite finely ground and mixed is used as a dip.

4. 30% copper carbonate and 70% bentonite intimately mixed in a finely ground condition for use as a dip.

5. 1% p-formaldehyde, 29% calcium sulphate and 70% bentonite are finely ground and mixed for use as a dip.

6. 5% mercurized toluidine, 25% calcium sulphate and 70% bentonite are finely ground and mixed for use as a dip.

The described compounds and method of applying the disinfectant which constitute my invention are productive of distinct commercial advantages. The elimination of the necessity for either a long soaking period or equipment for maintaining uniform high temperatures greatly attracts anyone who is familiar with the practical problem of potato seed treatment. All of the material can be used and the inevitable losses incidental to applying finely divided powder in dry form are eliminated. Since no agitation is required, injury to seeds, such as potatoes, is thus avoided and a source of power is not necessary. The fact that inert materials can be combined in the product to insure upon drying a hard coating that will not rub off in the subsequent handling is also important. Also, cut potatoes while still wet from cutting can be immediately treated and a uniform coating obtained. Dry dusting is practically impossible under these conditions.

I claim:

1. A seed disinfecting preparation which comprises in admixture a finely divided organic mercury compound and a finely divided material taken from a group including potter's clay, kaolin, bentonite, gelatin, glue, caesin and agar-agar and adapted to form with water a relatively permanent and substantially homogeneous suspension capable of adhering to the seeds.

2. A seed disinfecting preparation which comprises in admixture a finely divided mercurized phenol compound and a finely divided material taken from a group including potter's clay, kaolin, bentonite, gelatin, glue, caesin and agar-agar and adapted to form with water a relatively permanent and substantially homogeneous suspension capable of adhering to the seeds.

3. A seed disinfecting preparation which comprises in admixture a finely divided mercurized chlor-phenol compound and a finely divided material taken from a group including potter's clay, kaolin, bentonite, gelatin, glue, caesin and agar-agar and adapted to form with water a relatively permanent and substantially homogeneous suspension capable of forming a coating on the seeds.

4. A seed disinfecting preparation which comprises in admixture a finely divided mercurized nitro-chlor-phenol compound and a finely divided material taken from a group including potter's clay, kaolin, bentonite, gelatin, glue, caesin and agar-agar and adapted to form with water a relatively permanent and substantially homogeneous suspension capable of adhering to the seeds.

5. A seed disinfecting preparation which comprises in admixture a finely divided disinfecting organic mercury compound and bentonite.

6. A seed disinfecting preparation which comprises in admixture a finely divided disinfecting mercurized phenol compound and bentonite.

7. A seed disinfecting preparation which comprises in admixture a finely divided mercurized chlor-phenol compound and bentonite.

8. A seed disinfecting preparation which comprises in admixture a finely divided mercurized chlor-phenol compound, a finely divided mercurized nitro-phenol compound, and bentonite.

9. A seed disinfecting preparation which comprises in admixture mercurized ortho-chlor-phenol, mercurized ortho-nitro-phenol and bentonite.

In testimony whereof I affix my signature.

FOREST J. FUNK.